US007200869B1

(12) United States Patent
Hacherl et al.

(10) Patent No.: US 7,200,869 B1
(45) Date of Patent: Apr. 3, 2007

(54) SYSTEM AND METHOD FOR PROTECTING DOMAIN DATA AGAINST UNAUTHORIZED MODIFICATION

(75) Inventors: Donald J. Hacherl, North Bend, WA (US); Praerit Garg, Kirkland, WA (US); Murli D. Satagopan, Redmond, WA (US); Robert P. Reichel, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 09/663,811

(22) Filed: Sep. 15, 2000

(51) Int. Cl.
  *G06F 7/04* (2006.01)
  *G06F 17/30* (2006.01)
  *G06K 9/00* (2006.01)
  *H03M 1/68* (2006.01)
  *H04K 1/00* (2006.01)
  *G06F 15/16* (2006.01)
  *G06F 11/30* (2006.01)
  *G06F 12/14* (2006.01)
  *H04L 9/32* (2006.01)

(52) U.S. Cl. .......................... 726/27; 709/229; 726/2; 726/3; 726/4; 726/28; 726/29; 726/30; 713/193; 707/201; 707/204

(58) Field of Classification Search ............... 713/200, 713/201; 709/229; 726/2–4, 27–30
See application file for complete search history.

(56) References Cited

U.S. PATENT DOCUMENTS 5,469,556 A * 11/1995 Clifton ...................... 711/163
5,805,820 A * 9/1998 Bellovin et al. ............ 709/225
6,061,684 A * 5/2000 Glasser et al. ................ 707/9
6,088,451 A * 7/2000 He et al. ..................... 713/201

(Continued)

FOREIGN PATENT DOCUMENTS

WO     WO 9965207 A1 * 12/1999

OTHER PUBLICATIONS

"Active Directory Users, Computer, and Groups," *Microsoft Windows 2000 Server White Paper*, Feb. 2000, 33 pages.

(Continued)

*Primary Examiner*—Christopher Revak
*Assistant Examiner*—Shin-Hon Chen
(74) *Attorney, Agent, or Firm*—Merchant & Gould, P.C.; Ryan T. Grace

(57) ABSTRACT

Described is an invention for safeguarding against the modification of certain data associated with one domain of a distributed network by an entity (such as an administrator) within another domain of the distributed network while still allowing the entity to modify other data associated with the one domain. More particularly, security safeguards are applied by a directory replication service that operates to replicate the shared data to each domain in a domain "forest." Those security safeguards allow a user to indicate that certain modifications of specified shared data may only be made within the domain in which the shared data was created. In that way, a shared data namespace may still be implemented in which trust relationships exist so that, for example, an administrator in one domain may alter a configuration of another domain within the forest. However, certain data may be restricted by these safeguards such that certain modifications of that data (e.g., taking ownership of the data) may only be done from the domain which currently owns the data.

20 Claims, 6 Drawing Sheets

U.S. PATENT DOCUMENTS

| | | | |
|---|---|---|---|
| 6,226,752 B1 * | 5/2001 | Gupta et al. | 713/201 |
| 6,243,815 B1 * | 6/2001 | Antur et al. | 713/201 |
| 6,256,671 B1 * | 7/2001 | Strentzsch et al. | 709/227 |
| 6,295,605 B1 * | 9/2001 | Dockter et al. | 713/166 |
| 6,308,273 B1 * | 10/2001 | Goertzel et al. | 713/201 |
| 6,339,423 B1 * | 1/2002 | Sampson et al. | 345/854 |
| 6,421,686 B1 * | 7/2002 | Martin, Jr. | 707/201 |
| 6,453,354 B1 * | 9/2002 | Jiang et al. | 709/229 |
| 6,466,980 B1 * | 10/2002 | Lumelsky et al. | 709/226 |
| 6,571,278 B1 * | 5/2003 | Negishi et al. | 709/213 |
| 6,574,674 B1 * | 6/2003 | May et al. | 719/310 |
| 6,701,349 B1 * | 3/2004 | Cromer et al. | 709/207 |
| 6,839,843 B1 * | 1/2005 | Bacha et al. | 713/176 |

OTHER PUBLICATIONS

"Windows 2000 Security Technical Overview," *Microsoft Windows 2000 Server White Paper*, Jul. 2000, 30 pages.

\* cited by examiner

SYSTEM AND METHOD FOR PROTECTING DOMAIN DATA AGAINST UNAUTHORIZED MODIFICATION

TECHNICAL FIELD

The present invention relates to network-managed distributed databases. More particularly, the present invention relates to the security of replicated data in a distributed computing environment.

BACKGROUND OF THE INVENTION

The security of its data is always of great concern to a business or other enterprise. As computing networks evolve and become more distributed and more interconnected, that security risk becomes more and more difficult to manage. For example, a large enterprise may have a very large distributed computing network that includes many domains. It may be advantageous to allow much of the data to be shared or replicated across each domain within the entire network. Lately, innovations in technology have even enabled networks that allow multiple administrators (e.g., administrators within multiple domains) to manipulate or modify that shared data across domain boundaries by establishing "trust relationships" between those domains. For instance, an administrator within one domain may make changes to shared data stored within the administrator's own domain, and that data can be replicated to the other domains within the network. Often this ability simplifies the administration of large distributed networks by allowing an administrator to modify the configuration of another domain in the network without having to actually logon to a machine within that domain. Unfortunately, these innovations have also created unforeseen security risks, such as the ability for a malicious administrator acting in its own domain to modify data (e.g., important configuration data) owned by and associated with another domain. Until now, there have been no safeguards against an administrator acting within its own domain from maliciously modifying shared data such that the modification would be replicated back to the domain owning the shared data, possibly causing harm to that system.

SUMMARY OF THE INVENTION

Briefly described, the present invention safeguards against the modification of certain data associated with one domain of a distributed network by an entity (such as an administrator) within another domain of the distributed network while still allowing the entity to modify other data associated with the one domain. More particularly, security safeguards are applied by a directory replication service that operates to replicate the shared data to each domain in a domain "forest." Those security safeguards allow a user to indicate that certain modifications of specified shared data may only be made within the domain in which the shared data was created. In that way, a shared data namespace may still be implemented in which trust relationships exist so that, for example, an administrator in one domain may alter a configuration of another domain within the forest. However, certain data may be restricted by these safeguards such that certain modifications of that data (e.g., taking ownership of the data) may only be done from the domain in which the data was created.

In one aspect, the present invention implements a safeguard against particular fundamental modifications of any shared data (e.g., taking ownership of a replicated object). For example, a security check may be performed by a security subsystem of a computer hosting a replicated object. The security check may be invoked when a user of one machine in one domain of a forest attempts to make a fundamental modification (e.g., a change of ownership) to a replicated object. To that end, a data field may be included with the object that identifies the domain of the current owner of the object (typically the creator of the object). In response to an attempt by any user to make an identified fundamental change of the object, the security system may compare the current domain in which the user is logged on to the domain of the current owner of the object. If the two domains are dissimilar, the change may be disallowed. In addition, the user may be notified, such as by an LDAP referral message, of the proper domain in which to make the modification. In other words, if the user attempts to make a fundamental change to a replicated object from other than its native domain, the change is disallowed and the user is referred to the proper domain in which to make the change.

In another aspect, the present invention implements a safeguard against an administrator circumventing the security system by creating a mock security token that has permission to modify a secure object. In other words, the present invention addresses the danger of a user with the privilege of creating a mock security token identifying the user as a member of a group having modification permission of the object (i.e., "token stuffing"). The safeguard may be implemented by requiring that the evaluation of whether a user has permission to modify a replicated object occur within the domain in which the object was created. In one example, a field within a security descriptor associated with the object my be used to indicate that security evaluations for the object must occur within the owner's domain (e.g., a "home evaluation bit"). Privileges are machine and user specific, and, hence, the mock security token is not valid outside the domain in which it was created. Accordingly, if a user (such as a malicious system administrator) creates a mock security token and attempts to modify an object having its home evaluation bit set, the user is notified that the access rights must be evaluated at the owner's domain (in which the user does not have token-stuffing privilege), resulting in denied access to the object. The security system may additionally notify the user of the security failure, and refer the user to the proper domain in which the object may be modified.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features and advantages, which characterize the present invention, will be apparent from a reading of the following detailed description in conjunction with the associated drawings.

DETAILED DESCRIPTION OF THE PREFERRED EMBODIMENT

Illustrative Operating Environment

Figure 1:
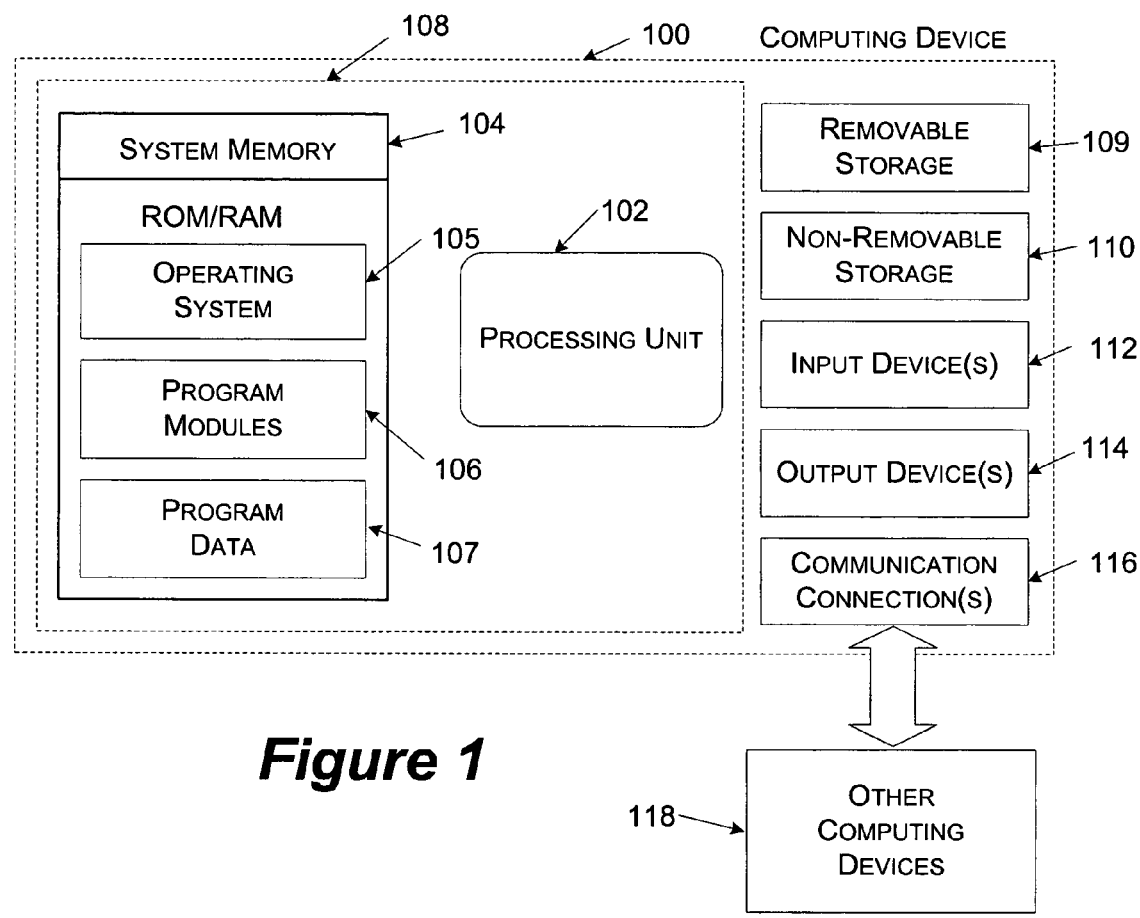
FIG. 1 is a functional block diagram of one computing device which may be adapted to embody one implementation of the present invention.

With reference to FIG. 1, an exemplary system for implementing the invention includes a computing device, such as computing device 100. In its most basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are well know in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
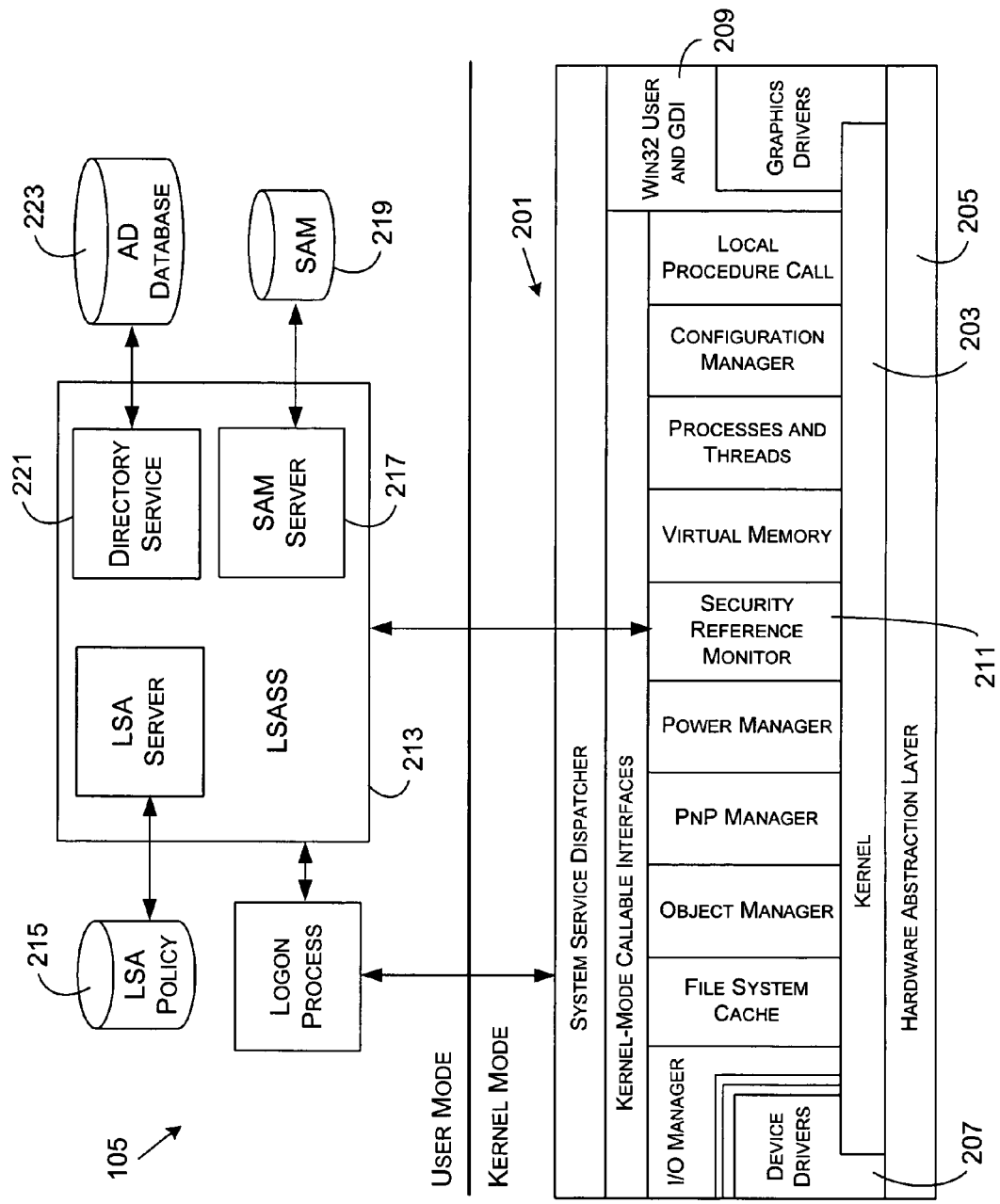
FIG. 2 is a functional block diagram of an exemplary operating system that may be adapted to embody one implementation of the present invention.

FIG. 2 is a functional block diagram of an exemplary operating system 105 in which one embodiment of an the present invention may be implemented. This embodiment of the invention is described through an implementation in the Windows 2000 operating system, owned and licensed by the Microsoft Corporation of Redmond, Wash. Although the invention will be described with respect to one implementation in the Windows 2000 operating system, those skilled in the art will appreciate that the teachings of the present invention have equal applicability to other embodiments in other operating systems. The exemplary operating system 105 provides two processor access modes: a user mode (above the horizontal dividing line) and a kernel mode (below the horizontal dividing line). User mode refers to a mode of execution wherein a process has limited access to system memory and processor instructions. User mode is typically used to execute user applications. Kernel mode refers to a mode of execution that grants access to all system memory and all processor instructions. Typically, the kernel mode is reserved for system code execution, such as system services and device drivers.

The operating system components that reside in kernel mode include an "executive" 201, a kernel 203, a hardware abstraction layer 205, one or more device drivers 207, and a windowing and graphics system 209. A full and complete description of most of those components, including the several services and functions making up the executive 201, may be found in Solomon & Russinovich, *Inside Microsoft Windows* 2000 ($3^{rd}$ ed.) published by Microsoft Press. Of particular notice is the Security Reference Monitor (SRM) component 211 of the executive 201. The SRM is the kernel-mode component of the operating system 105 that is configured to perform security access checks on objects, user rights (such as privileges), and to generate any resulting security audit messages. Among other things, the SRM 211 interacts with the Local Security Authority Subsystem (LSASS) 213. The LSASS 213 is a user-mode process that is responsible for local system security policy, such as identifying which users are allowed to log on to the machine, password policies, privileges granted to users and groups, and the system security auditing settings. The LSASS 213 is also responsible for user authentication and sending security audit messages to an event log. The LSA policy database 215 contains the local system security policy settings, which include such information as what domains are entrusted to authenticate logon attempts, the users that have permission to access the system, the privileges assigned to authorized users, and the like. A user-mode logon process 220 interacts with the LSASS 213 to manage interactive logon sessions. For example, the logon process 220 creates a user's shell process when the user logs on.

Also included in the LSASS 213 is a Security Accounts Manager (SAM) server 217, which is a set of routines configured to manage the SAM database 219. The SAM database 219 contains the defined local users and groups, along with their passwords and other attributes. Another component of the LSASS 213 is a directory service 221, which manages a directory service database 223. Before proceeding with a detailed discussion of the security safeguards enabled by the present invention, some discussion of one directory service and other key concepts is helpful to provide an understanding of an environment which may benefit greatly from those security safeguards.

The Directory Service

The directory service 221 may be one implementation of the Lightweight Directory Access Protocol (LDAP) standard for directory access. The Active Directory™ directory service, developed and licensed by the Microsoft Corporation of Redmond, Wash. is one example of such a directory service. Although the invention may be preferably implemented in the Active Directory directory service, other directory services, such as Novell, Inc.'s NDS eDirectory™ or iPlanet's Directory Server™ service, may also benefit from the teachings of the invention. The directory service 221 stores information about objects in a domain, including users, groups, and computers. An object contains information (called attributes) about an individual item, such as a particular user, computer, or piece of hardware. For example, a user object's attributes would likely include name, telephone number, and manager name. For the purpose of this discussion, a "domain" is a collection of computers and their associated security groups that are managed as a single entity. Password information and privileges for domain users and groups are stored in the directory service, which is replicated across the computers that are designated as domain controllers of the domain. A "domain controller" is a server holding a replicated directory partition within a domain. A domain may have more than one domain controller.

Figure 3:
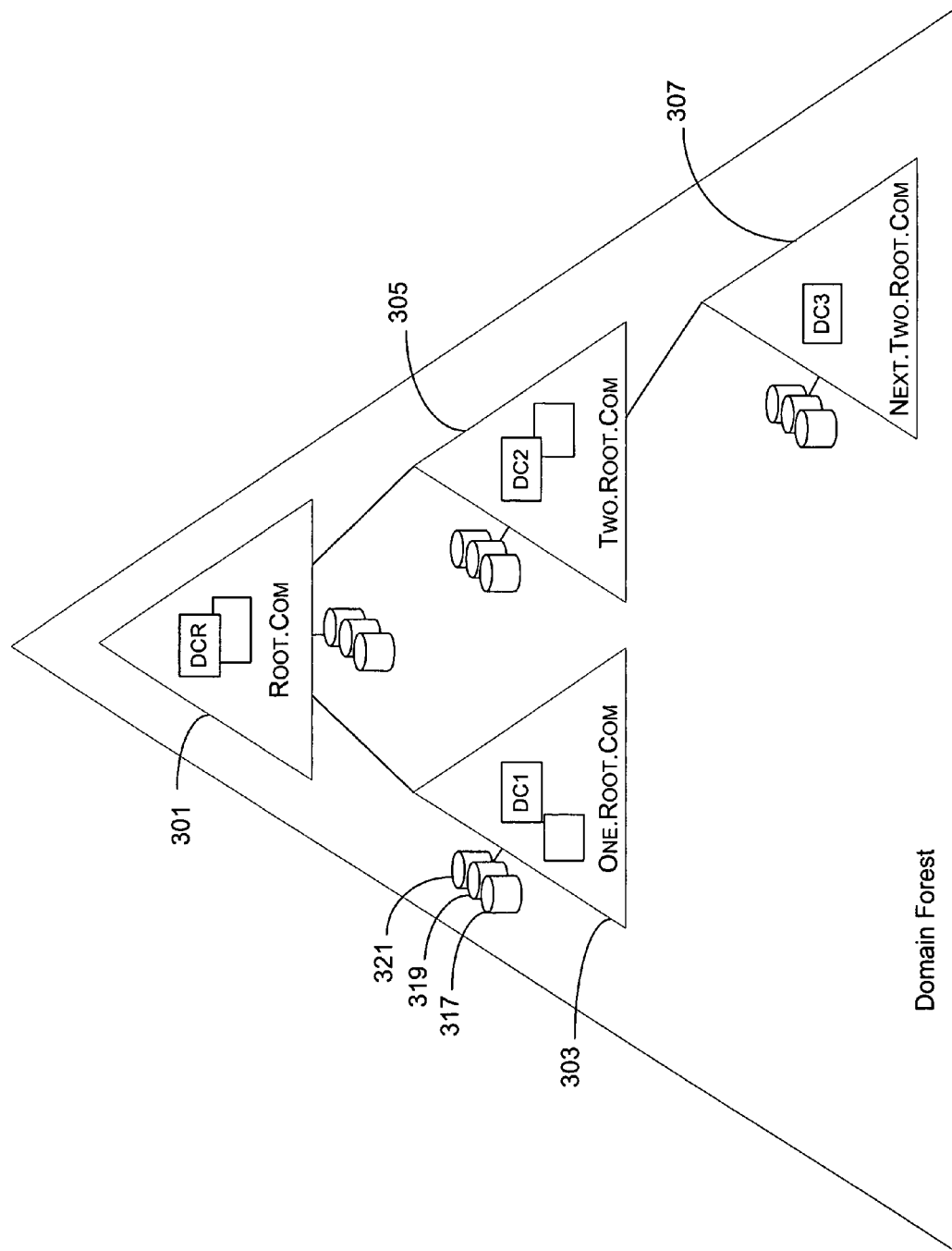
FIG. 3 is a conceptual overview of a forest of domains in an environment in which an embodiment of the present invention may be implemented.

Larger organizations may contain multiple domains, in which case the hierarchy of domains is called a domain tree. The first domain created is the root domain, and is the parent to domains created beneath it, which are called child domains. To support very large organizations, domain trees can be linked together into an arrangement called a forest. Referring to FIG. 3, a sample domain forest 300 is illustrated including root domain "Root.com" 301, having child domains "one.root.com" 303 and "two.root.com" 305. Domain two.root.com 305 includes child domain "next.two.root.com" 307. At least one domain controller (DCR, DC1, DC2, DC3) exists in each domain and houses the directory service partition.

The information stored by the directory service on every domain controller may be partitioned into three categories: Domain, Schema, and Configuration data. The Domain data directory partition 317 contains the objects in the directory for a domain. Domain data in each domain is replicated to every domain controller in that domain, but not beyond its domain. The Schema data directory partition 319 contains the object types (and their attributes) that can be created with the directory service. The Schema data is common to all domains in the domain tree or forest, and is replicated to all domain controllers in the forest. The Configuration data directory partition 321 contains replication topology and related metadata. Applications may store information in the Configuration directory partition. This data is common to all domains in the domain tree or forest, and also is replicated to all domain controllers in the forest. In cases where multiple domain controllers are used within a domain, the objects are replicated at regular intervals to each domain controller in the domain so that the databases are always synchronized. In this way, the directory service 221 creates a structure that allows any object on a network to be tracked and located, even across domains.

The directory service may support trust relationships between domains. A trust relationship is a logical relationship established between domains to support passthrough authentication, allowing users and computers to be authenticated in any domain in the forest. This lets users or computers access any resources for which they have the appropriate permissions, while only logging on to the network once. This ability to traverse a number of domains illustrates the term transitive trust, which refers to authentication across a chain of trust relationships.

The directory service may be very attractive to large enterprises because of the ability of network administrators to manage network resources across domains. An administrator in one domain may modify an object in the directory service, such as an object class stored in the Schema data directory partition, which is then replicated throughout a domain forest. However, with these advantages have come a new breed of security risks. In particular, certain users (e.g., administrators within one domain) could potentially circumvent the traditional security features used to govern access to objects stored within a domain. Again, more background on the security features implemented in an operating system may be helpful to clarify the potential security risk.

Security Concepts

Figure 5:
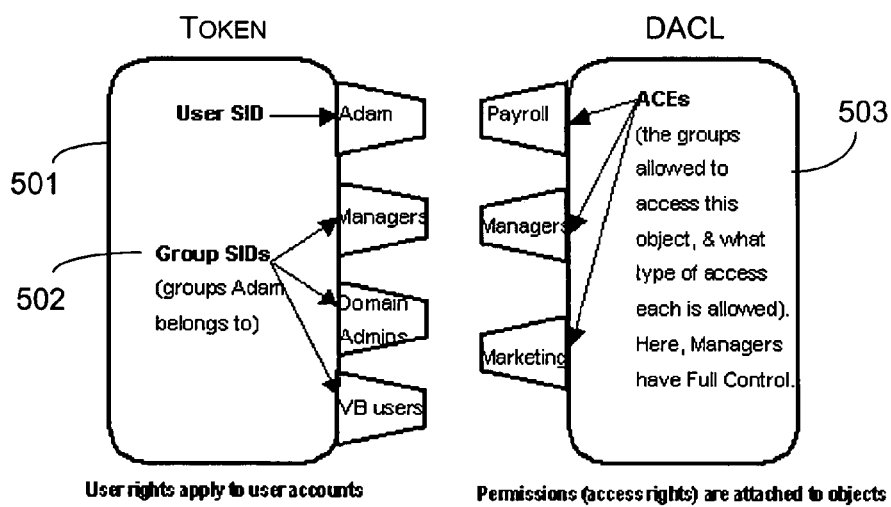
FIG. 5 is a functional block diagram of a user access token and an access control list that may be used in one implementation of the present invention.

Referring now to FIGS. 2 and 5, when a user logs on to a computing device, typically, the operating system 105 creates an access token 501 (FIG. 5) for the user's process. The access token 501 represents the user account and typically identifies two things: the groups 502 to which the user belongs, and the privileges granted to the user or to groups to which the user belongs. Objects typically include a security descriptor 503 (described in greater detail later) that identifies which groups have access permission (such as Read, Write, Full Control, or No Access) for the object. FIG. 5 shows how a user's access token and an object's security descriptor 503 let the user (in this case) access the object. When the user tries to access the object, the operating system determines whether the user access token 501 indicates that the user is a member of any group which has access permissions as defined in the object's security descriptor 503. If so, then the access is allowed, otherwise the access is denied unless the user token 501 indicates that the user's privileges convey upon the user access rights which the user's group membership do not. Such privileges are often necessary to allow a user, such as an administrator, to manage a computer system even though the user is not a member of a group that has access permission to the object. However, privileges are valid for a user on a particular machine only, so that while the user is always a member of the same groups on any machine, the user's privileges are generally not the same depending on which machine the user logs on. One common example of such a scenario is a Back Up Files and Directories privilege.

One machine-specific privilege that is commonly granted to system administrators is the "Take Ownership" privilege. This privilege allows a user to take ownership of an object even though the user may not have permission to modify the object. One situation in which this privilege is commonly used is when an employee leaves a company without granting anyone at the company access permission to objects owned by the employee. In that situation, an administrator with the privilege to take ownership of the objects left by the employee may do so and then simply grant read/write permissions (or other permissions) to any users or groups the administrator desires. Other privileges relevant to this discussion include a "Create Token" privilege (which allows a user to create an arbitrary token) and a "TCB" privilege (which allows the user to attach that token to the user's process). With this background, we may return to the potential security risks within some directory services.

Potential Security Risks with a Directory Service

An administrator in one domain with the appropriate privileges could, in the absence of the security safeguards made possible by the present invention, exercise certain privileges often granted to administrators. For example, an administrator (or other user) with a Take Ownership privilege could potentially take ownership of an object (including Schema data or Configuration data) in the directory service even though that administrator may not have access permission to the object. Once the administrator has taken ownership of the object, as mentioned above, the administrator can add any permissions desired to exercise complete control over the object. Moreover, the modification (because it is to an object within the directory service) would be replicated to each domain controller in the domain forest. In that way, a malicious administrator could cause much damage to otherwise secure configuration or schema data owned by administrators in other domains.

Another security risk relates to the misuse of the Create Token and TCB privileges. Typically, those privileges are used by an administrator to impersonate another user or trusted process, such as for the purpose of temporarily granting permissions to an executing process. However, a malicious user with those privileges could create a token that identifies the malicious user as a member of a group that has access permission to a shared resource or object in the shared directory service (e.g., an administrator from another domain) and then attach that token to the malicious user's process. In that way, the malicious user could grant himself unauthorized access to shared objects. It is in view of these and other threats that the present invention, among other things, enables new security safeguards. The safeguards help prevent an administrator in one domain from performing unauthorized modifications on objects owned by a user in another domain, while maintaining the benefits of a distributed directory service, namely allowing enterprise-wide access and administration of shared resources.

Security Safeguards

Figure 4:
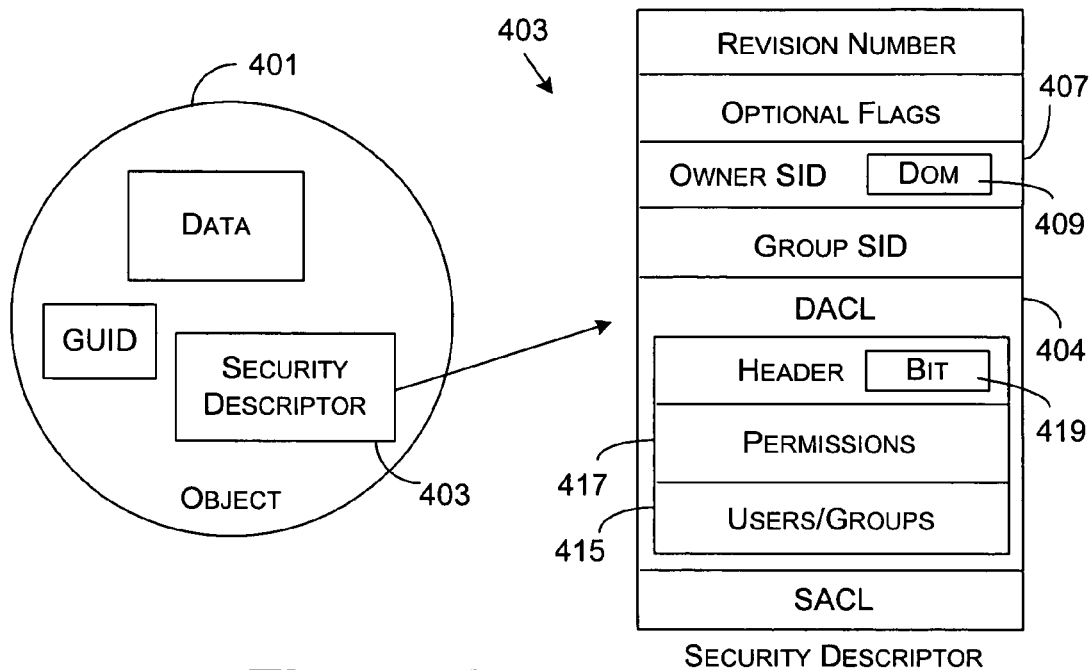
FIG. 4 is a functional block diagram of an object and its security descriptor as used in one implementation of the present invention.

The safeguards envisioned by the present invention may be implemented as additional security access checks performed when a user makes an access attempt on an object. Referring now to FIG. 4, an object 401 within the directory service, such as a configuration object or a schema object, includes a security descriptor 403. The security descriptor 403 includes, among other things, a Discretionary Access Control List (DACL) 404 and an Owner Security Identifier (SID) 407. A SID is a code that uniquely identifies a specific user, group, or computer to the security system. A user's own SID is always attached to the user's access token. The DACL 504 includes a list 415 of user accounts, groups, and computers that are allowed (or denied) access to the object 401. The DACL 404 also includes a list 417 of Access Control Entries (ACEs), where each ACE lists the permissions granted or denied to the users, groups, or computers listed in the DACL 404. An ACE contains a SID with a permission, such as Read access or Write access. Moreover, the DACL 404 includes a header field which may have a bit 419 that can be set to indicate that the access rights for the object 401 should be specially evaluated when any modification is attempted on the object 401 (discussed in detail below).

In the described embodiment, the Owner SID 407 includes a Domain ID 409 associated with the current owner of the object and which identifies an owner's domain. In accordance with this embodiment of the invention, the directory service 221 and the SAM server 217, in conjunction with the SRM 211, (FIG. 2) are configured to perform an additional security access check when a user attempts to perform a fundamental modification (e.g., take ownership) of an object. The additional security check includes identifying when the fundamental modification of an object has been requested, and in response, comparing the Domain ID 409 stored in the security descriptor 403 for the object with the domain of the user requesting the privileged modification. If the Domain ID 409 does not match the current domain, then the security subsystem fails the attempted modification. In addition, a message may be sent to the user indicating that the attempt failed, and possibly referring the user to the proper domain in which to attempt the modification. One example of such a message may be the "referral error" defined in the Lightweight Directory Access Protocol (v3) specification.

In an alternative embodiment, a field in the security descriptor 403 is used to indicate that security access evaluations must be performed within the home domain of the object. One example of the field that may be used is a previously unused bit in the header portion of the object's DACL 404. Another safeguard may be implemented by one component (e.g., the SAM Server 217, the SRM 211, or the directory service 221) within the security subsystem of the operating system 105 to check whether the bit 419 in the header field is set, and if so, then causing further object access evaluations to be performed within the domain of the owner of the object. In other words, if a user attempts to modify an object having this special bit 419 set, the security system of the computer on which the attempt is made will return a failure to the user with a referral to the proper domain in which the security evaluation must be made. This safeguard overcomes the potential of a malicious administrator or other user taking advantage of the Create Token and TCB privileges described above. Although an unlikely threat, this additional safeguard allows an enterprise to identify certain data to be treated with heightened security.

Moreover, those skilled in the art will appreciate that the security system and the directory service 221 (FIG. 2) may additionally be configured to bypass these additional security safeguards for certain users (such as administrators) operating within a particular domain, such as the root domain of the forest (FIG. 3). In this way, an enterprise may take advantage of the additional safety of these security safeguards while continuing the power in administrators of a limited number, even a single domain to configure or modify objects managed by the directory service throughout every domain in the forest.

The logical operations of the various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention are referred to variously as operations, structural devices, acts, or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto. In addition, the various embodiments described above are provided by way of illustration only and do not limit the invention. It is anticipated that those skilled in the art will recognize various modifications and changes that may be made to the example embodiments and applications illustrated and described above without departing from the true spirit and scope of the present invention, which is set forth in the claims at the end of this application.

Figure 6:
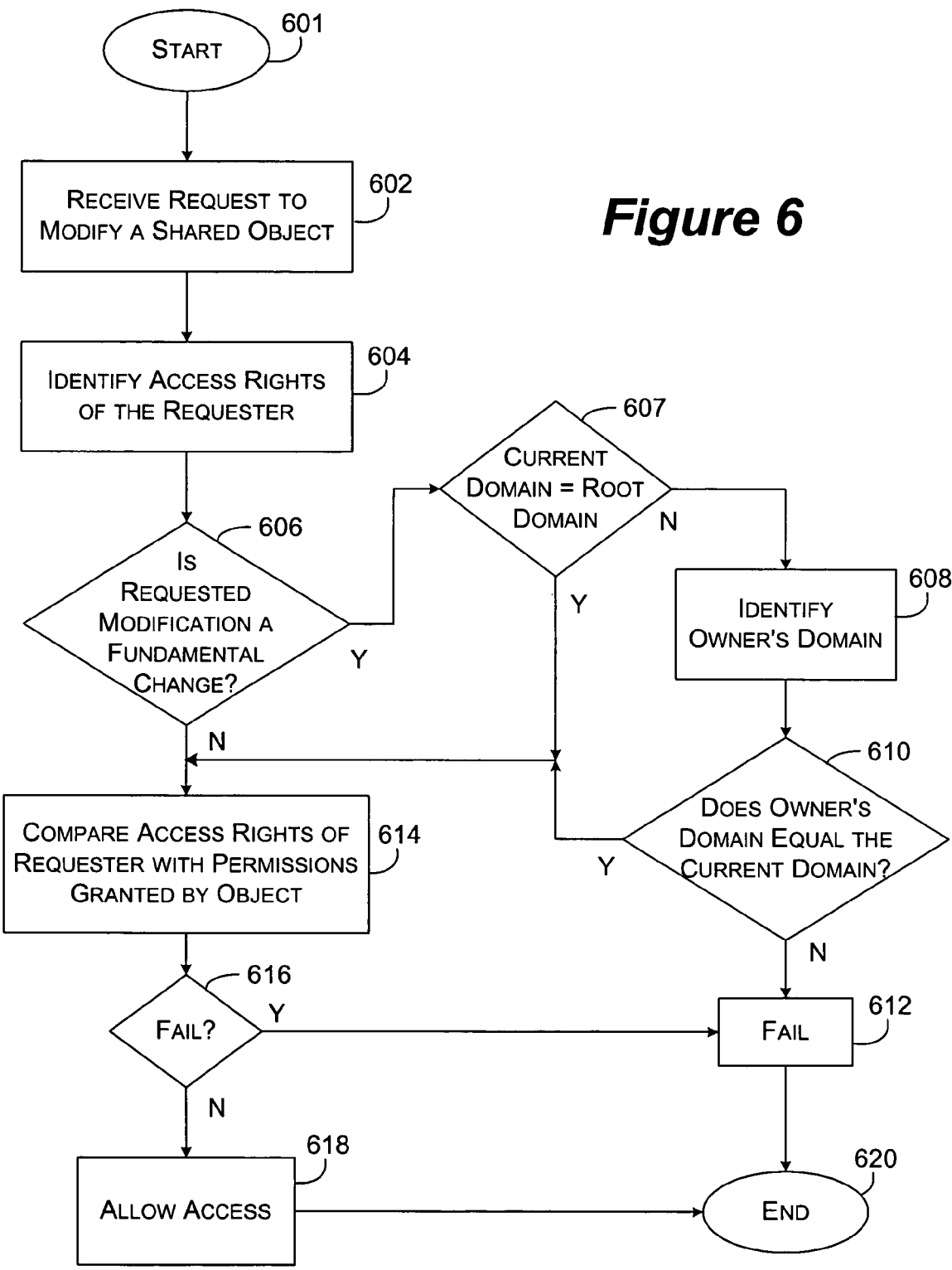
FIG. 6 is a logical flow diagram illustrating an illustrative process implementing one embodiment of the present invention to safeguard domain data.

FIG. 6 is a logical flow diagram illustrating an illustrative process implementing one embodiment of the present invention. The process begins at starting block 601, where a user has logged in to a domain within a domain forest. The user may be an administrator having certain administrative privileges on the machine on which the administrator is logged on. The forest may implement the directory service 221 described above, and, consequently, each domain includes replicated data from each domain within the forest. When the user attempts to access or modify an object managed by the directory service 221, the process proceeds to block 602.

At block 602, a service, such as the directory service 221 (FIG. 2) receives the request from the user to modify an object within the shared space. The object may be a configuration object within the Configuration data partition, schema data within the Schema data partition, or any other shared object. In response to receiving the request, the process proceeds to block 604.

At block 604, a security subsystem, acting in cooperation with the service described above at block 602, identifies the access rights of the requester. As described above, when a user logs on to a domain, a token may be created, such as token 601 identifying the groups to which the user belongs. In addition, the token may identify any machine-specific access privileges associated with the user. The process continues at decision block 606.

At decision block 606, a determination is made whether the requested modification would amount to a fundamental change to the object, such as a Take Ownership request, or the like. For the purpose of this discussion, a "fundamental change" is a modification to an object by a user which would allow the user to then modify access permissions of the object or other fundamental security aspects of the object. If the requested modification is not a fundamental change, the process continues to block 614 and access rights are determined in the usual manner, as described below. If the requested modification is a fundamental change, the process continues to decision block 607.

At decision block 607, a determination is made whether the current domain in which the request to modify the object has occurred is the root domain of the domain forest. As mentioned above, in some instances, an enterprise may desire to allow one or more domains to have modification privileges over most or even all objects within the domain forest. For example, to grant at least one domain the privilege to delete resources or objects of a domain that has been decommissioned or is otherwise unavailable. Thus, in that case, the process would identify that the current domain is such a domain, and the process would continue to block 614. If, however, the current domain is not such a domain, the process continues to block 608.

At block 608, the security subsystem, again acting in cooperation with the service described above at block 602, identifies the domain of the current owner of the object. In one example, a Owner SID field 407 includes a domain ID 409 associated with the current owner of the object. From that information, the security subsystem identifies the owner's domain.

At decision block 610, a determination is made whether the owner's domain (identified at block 608) matches the current domain in which the requester has requested the fundamental change to the object. If the domains match, the process continues to block 614, and access rights are determined in the usual manner, as described below. However, if the domains do not match, the process continues to block 612, where the requested modification is failed. A notification, such as an LDAP referral message to the owner's domain, may be issued to the requester in conjunction with a failure notice.

If, however, either the requested modification is not a fundamental modification or the owner's domain matches the current domain, the process performs a traditional access rights evaluation at block 614. For example, the security subsystem may compare any permissions granted or denied to particular groups in a security descriptor of the object with any identified users or groups in a security token for the requester. If, at decision block 616, the requester does not have access rights, then the process proceeds to block 612 where an access violation notification may be issued to the requester. Otherwise, if the requester does have the appropriate access rights, at block 618 the requested modification is allowed, and the process ends at block 620.

Figure 7:
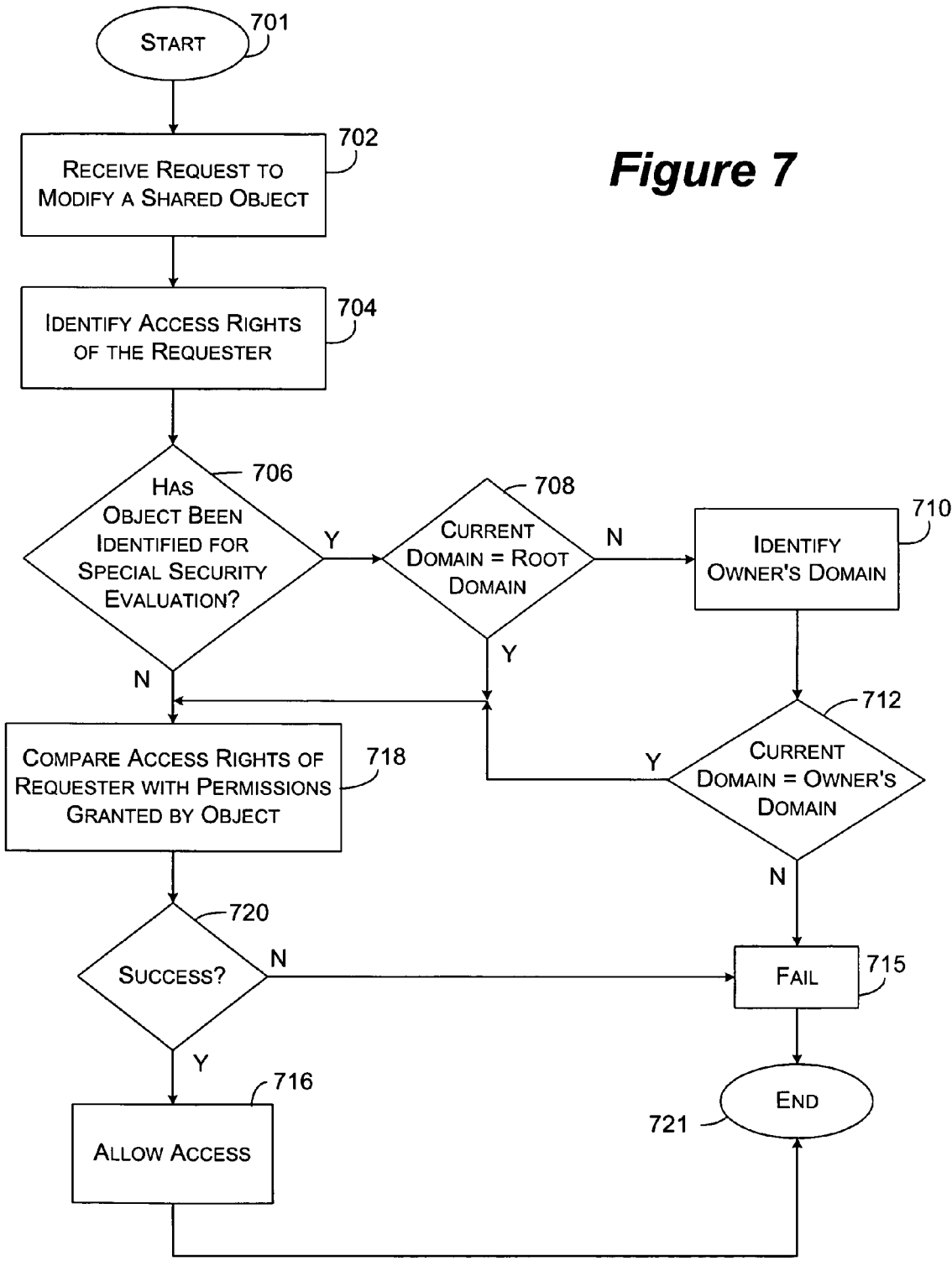
FIG. 7 is a logical flow diagram illustrating another illustrative process implementing another embodiment of the present invention to safeguard particular domain data.

FIG. 7 is a logical flow diagram illustrating another illustrative process implementing another embodiment of the present invention. The process begins at starting block 701, where a user has logged in to a domain within a domain forest. The user may be an administrator having certain administrative privileges on the machine on which the administrator is logged on. The forest may implement the directory service 221 described above, and, consequently, each domain includes replicated data from each domain within the forest. When the user attempts to access or modify an object managed by the directory service, the process proceeds to block 702.

At block 702, a service, such as the directory service 221 (FIG. 2) receives the request from the user to modify an object within the shared space. The object may be a configuration object within the Configuration data partition, schema data within the Schema data partition, or any other shared object. In response to receiving the request, the process proceeds to block 704.

At block 704, a security subsystem, acting in cooperation with the service described above at block 702, identifies the access rights of the requester. As described above, when a user logs on to a domain, a token may be created, such as token 501 identifying the groups to which the user belongs. In addition, the token 501 may identify any machine-specific access privileges associated with the user. The process continues at decision block 706.

At decision block 706, a determination is made whether the object has been identified for special security evaluation. In one example, a bit in a header field of a security descriptor associated with the object may be used to indicate that security evaluations on the object are to be evaluated in the domain of the owner of the object. If the object has not been identified for special security evaluation, the process continues to block 718, where the security access evaluation occurs in the standard manner. However, if the determination is positive, the process continues to decision block 708.

At decision block 708, a determination is made whether the current domain in which the request to modify the object has occurred is the root domain of the domain forest. As mentioned above, in some instances, an enterprise may, by policy, desire to allow one or more domains to have special modification privileges over most or even all objects within the domain forest. If so, then the enterprise may identify those domains, such as the root domain, to be exempt from the additional security safeguards implemented by this embodiment of the present invention. In that case, the process would identify that the current domain is such a domain, and the process would continue to block 718. If, however, the current domain is not such a domain, the process continues to block 710, where the owner's domain is identified as above, such as from the Owner SID field 407 within a security descriptor associated with the object. Once the process has identified the owner's domain, the process continues to decision block 712.

At decision block 712, the security system associated with the directory service has determined that the security evaluation for the identified object should occur at the owner's domain, so it then determines whether the current domain is the owner's domain. If the current domain is the owner's domain, the process returns to block 718 where the security access evaluation is performed in the standard manner. Otherwise, the process continues to block 715 where the access fails.

At block 715, the security system denies access to the object. In the case where the denial is because the security evaluation should be performed at the owner's domain, the user may be notified that the access rights must be evaluated at the owner's domain (in which the user does not have token-stuffing privilege). The security system may additionally notify the user of the security failure, and refer the user to the proper domain in which the object may be modified. In this way, if a phony user token had been created by using special privileges to circumvent the security evaluation in the current domain, that phony token would not be effective outside the domain in which it was created (in fact, it probably wouldn't be effective anywhere except the machine on which it was created). Alternatively, the security system could pass the security context of the requester and the security descriptor of the object to a domain controller in the owner's domain for evaluation. At block 716, the security evaluation of the requested modification has been approved. Accordingly, the requested modification of the object is allowed, and the process ends at ending block 721.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having computer-executable instructions for protecting network domain data against unauthorized modification in a distributed computer network having a plurality of network domains, comprising:
receiving, at a first computing machine, a request to modify an object associated with a shared data structure of a data store, wherein the data structure is replicated on the plurality of network domains, wherein the first computing machine resides in at least one of the network domains, wherein the object includes a security descriptor identifying an owner network domain of the object and an identification of at least one user, wherein the request includes at least one member of a group comprising: a fundamental modification and the security descriptor indicating a special security evaluation;
when the request includes a fundamental modification, determining whether the first computing machine resides in the owner network domain by retrieving from the security descriptor the identity of the owner network domain and comparing the owner network domain identity to the network domain within which the first computing machine resides;
rejecting the request to modify the object when the first computing machine does not reside in the owner network domain; and
when the request includes the security descriptor indicating the special security evaluation,
sending a notification to the first computing machine that a security evaluation is to be evaluated within the owner network domain.

2. The computer-readable storage medium of claim 1, further comprising, allowing the request to modify the object when the first computing machine resides in the owner network domain.

3. The computer-readable storage medium of claim 1, wherein the security descriptor further comprises a field that indicates that the special security evaluation should be performed on requests to modify the object.

4. The computer-readable storage medium of claim 3, wherein the special security evaluation comprises requesting that a second computing machine within the owner network domain evaluate whether an entity issuing the request to modify the object is authorized to modify the object.

5. The computer-readable storage medium of claim 1, wherein the security descriptor includes permissions associated with the at least one user.

6. A computer-implemented method for protecting network domain data against unauthorized modification in a distributed computer network having a plurality of network domains, comprising:
receiving, from a requester at a first machine in a first network domain in the plurality of network domains, a request to modify an object, wherein the object is associated with a shared data structure replicated on the plurality of network domains, the request including a security token identifying at least one group of which the requester is a member, the object having an associated security descriptor identifying an owner network domain of the object and having an identification of at least one user, the object having a flag to identify whether a special security evaluation is to be performed on requests to modify the object;
determining from the flag whether the special security evaluation is to be performed on the request to modify the object;
when the flag indicates that the special security evaluation is to be performed, performing the special security evaluation on the request to modify the object when the flag indicates in the affirmative, wherein the special security evaluation on the request to modify the object is performed by passing the security token associated with the request and the security descriptor associated with the object to the owner network domain for evaluation, and allowing the request to modify the object to proceed when the special security evaluation approves the request to modify the object;
when the flag indicates that the special security evaluation is not to be performed, performing a security evaluation on the first network domain.

7. The computer-implemented method of claim 6, further comprising, performing a security evaluation on the request to modify the object when the flag indicates in the negative.

8. The computer-implemented method of claim 7, wherein the security evaluation comprises comparing the security token with the security descriptor to determine whether the requester is a member of any group that have been granted permission to access the object.

9. The computer-implemented method of claim 8, wherein the security evaluation further comprises determining whether the request to modify the object is a modification for which the requester is privileged on the first machine regardless of whether the requester is a member of any groups that have been granted permission to access the object.

10. The computer-implemented method of claim 9, wherein the security evaluation further comprises denying the request when the requester is privileged to perform the request to modify the object, the requested modification is a fundamental modification of the object, and the first network domain is not the owner network domain of the object.

11. The computer-implemented method of claim 6, wherein the security descriptor includes permissions associated with the at least one user.

12. The computer-implemented method of claim 6, wherein the request to modify the object includes a request to make a fundamental change.

13. A computer-readable storage medium having computer-executable components to protect network domain data against unauthorized modification in a distributed computer network having a plurality of network domains; comprising:

a shared data structure of the plurality of domains, at least two network domains in the plurality of network domains having a transitive trust relationship wherein a user authentication within one of the two network domains is honored in the other of the two network domains, the shared data structure having at least one data store that is replicated among each of the plurality of network domains;

an object stored within the data store, the object having a plurality of attributes, at least one of the attributes being related to security access rights associated with the object, the security access rights including an owner network domain identifier identifying one of the domains within the plurality of domains, an indicator configured to indicate that an attempt to access the object is to be evaluated within the network domain identified by the owner network domain, and an identification of at least one user; and a security system configured to receive a request to modify the object, to determine from the indicator whether the request to modify the object should be evaluated within the network domain identified by the owner, and when so, to return a notification to the requester that the security evaluation is to be evaluated within the network domain identified by the owner network domain, to retrieve from the object the owner network domain identifier, to compare the owner network domain identifier with an identifier of a network domain from which the request originated, and to reject the request to modify the object if the owner network domain identifier does not match the identifier of the network domain from which the request originated.

14. The computer-readable storage medium of claim 13, wherein the notification to the requestor comprises a referral message including an identification of the owner network domain.

15. The computer-readable storage medium of claim 13, wherein the security system is further configured to determine whether the request to modify the object originated within a particular network domain of the plurality of network domains, and when so, perform a standard security evaluation of the request to modify the object without resort to the owner network domain.

16. The computer-readable storage medium of claim 15, wherein the particular network domain is a root network domain of the shared data structure.

17. The computer-readable storage medium of claim 13, wherein the shared data structure comprises a directory service and wherein the at least one data store comprises configuration data associated with the directory service.

18. The computer-readable storage medium of claim 13, wherein the shared data structure comprises a directory service and wherein the at least one data store comprises schema data associated with the directory service.

19. The computer-readable storage medium of claim 13, wherein the at least one attribute comprises a security descriptor and permissions associated with the at least one user one or more users, and the owner network domain identifier is part of an owner security identifier.

20. The computer-readable storage medium of claim 13, wherein the request to modify the object includes a request to make a fundamental change.

* * * * *